United States Patent
Filipp

[11] Patent Number: 5,948,445
[45] Date of Patent: Sep. 7, 1999

[54] GAS-ASSISTED INJECTION MOLD

[75] Inventor: William Joseph Filipp, Shelby Township, Macomb County, Mich.

[73] Assignee: General Motors Corporation, Detroit, Mich.

[21] Appl. No.: 08/940,335

[22] Filed: Sep. 30, 1997

[51] Int. Cl.[6] .................................................. B29C 45/16
[52] U.S. Cl. ............................................. 425/130; 264/572
[58] Field of Search ............................... 425/130; 264/572

[56] References Cited

U.S. PATENT DOCUMENTS 5,162,230  11/1992  Ziegler et al. ............................ 264/572

*Primary Examiner*—Tim Heitbrink
*Attorney, Agent, or Firm*—George A. Grove; Kathryn A. Marra

[57] ABSTRACT

A gas-assisted injection mold has a gas injection nozzle protruding into a mold cavity from a mold surface that defines a part of the mold cavity. The mold surface has a barrier in a spaced surrounding relationship to the gas injection nozzle to prevent the plastic melt from being lifted away from the mold surface as gas is injected into the plastic melt in the mold cavity. The barrier may take the form of a well or a boss.

4 Claims, 2 Drawing Sheets

GAS-ASSISTED INJECTION MOLD

TECHNICAL FIELD

This invention relates generally to molds for plastic injection molding and more particularly to a gas-assisted injection mold.

BACKGROUND OF THE INVENTION

Injection molding is the process in which polymeric material is melted and, by means of a rotating screw, injected into a mold cavity that is created by a mold that generally comprises upper and lower mold parts. The material cools and solidifies into a shape conforming to the cavity. The cast or injection molded part, which is then ejected from the molding tool, is usually finished and requires no further steps before being used in an assembly or as an end product.

However, a persistent injection molding problem is sink marks, common to thick parts or parts with varying thick and thin sections. Consequently, as far back as 20 years ago, injection molding processes were conceived in which gas is injected into the plastic melt within the mold cavity to counteract sink marks by creating hollow cores, thus making the part sections more alike in thickness as well as reducing part weight.

Interest in gas injection has revived in recent years due to the development of processes in which continuous pressure of the gas is the control factor for the gas injection which results in parts that come out of the injection mold free of blemishes.

In these gas-assisted injection molding processes, nitrogen, an inexpensive inert gas, is commonly introduced into the plastic melt in the mold cavity, and in known processes, the gas is introduced into the plastic melt through a gas injection nozzle. The gas does not mix with the plastic melt, but takes the line of least resistance through the less viscous parts of the plastic melt. The plastic melt is pushed against the walls of the mold cavity, leaving hollow cores or channels within the part.

With such gas assist techniques, hollow parts and parts with heavy ribs and bosses can be achieved with low in-mold stresses, reduced part warpage, and the elimination of sinks. Gas-assisted injection molding also offers potential for material savings, lower clamp tonnage requirements and reduced cooling/cycle times.

However, if the plastic melt does not seal around the tip of the gas injection nozzle, the path of least resistance may lead to a surface of the mold cavity, in which case the gas injected into the mold cavity through the gas injection nozzle flows through the plastic melt and directly against the surface of the mold cavity. The gas may then force the plastic melt up and away from the mold surface, resulting in a part that does not have the proper gas penetration and/or a part that is deformed or warped at the gas injection nozzle and/or a part that is not fully packed out.

SUMMARY OF THE INVENTION

The object of this invention is to provide a gas-assisted injection mold that has a gas injection nozzle that projects into the mold cavity from a surface of the mold cavity that is shaped to prevent the plastic melt from being lifted away from the surface as gas is injected into the plastic melt in the mold cavity.

A feature of the invention is that the gas-assisted injection mold has a gas injection nozzle that projects into a mold cavity from a surface of the mold cavity and a barrier formed in the surface of the mold cavity in a spaced surrounding relationship to the gas injection nozzle.

In one aspect of the invention, the barrier takes the form of a concentric annular well that is recessed into the surface of the mold cavity in a radially spaced relationship around the base of the gas injection nozzle.

In another aspect of the invention, the barrier takes the form of a concentric annular boss that is raised out of the surface of the mold cavity in a radially spaced relationship around the base of the, gas injection nozzle.

These and other objects, features and advantages of the invention will become apparent from the description below, which is given by way of example with reference to the accompanying drawings.

DESCRIPTION OF THE PREFERRED EMBODIMENT

Figure 1:
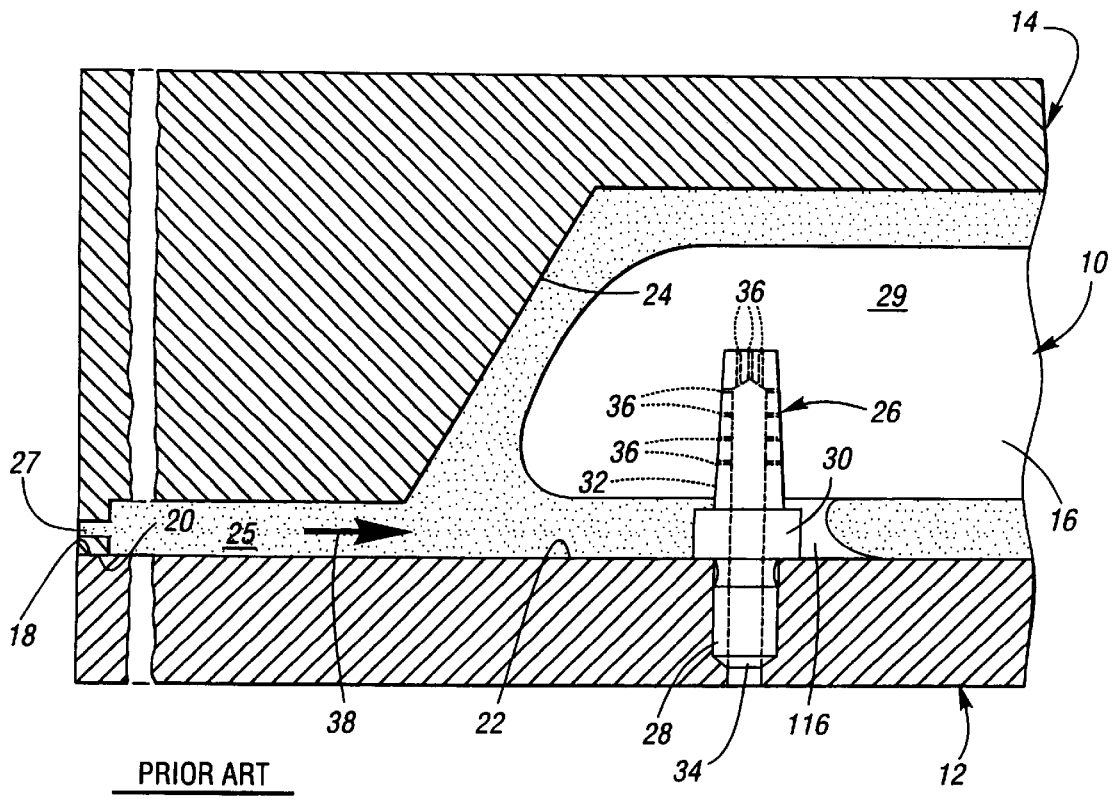
FIG. 1 is a fragmentary longitudinal section of a conventional gas-assisted injection mold that is equipped with a stationary gas injection nozzle.

Referring to FIG. 1, the conventional gas-assisted injection mold 10 of the prior art comprises a lower mold part 12 and an upper mold part 14 that are clamped together to form a mold cavity 16.

When clamped together, mold parts 12 and 14 have peripheral surfaces 18 and 20 engaging each other and mold surfaces 22 and 24 that define the mold cavity 16 that is typically shaped to cast a part that has thin and thick sections.

The cast part is generally formed by injecting a plastic melt 25 into the mold cavity 16 through a plastic injection nozzle indicated schematically at 27 and ejecting the cast part from the mold after the plastic melt cools and solidifies. After the plastic melt 25 is injected into the mold cavity 16 and while the plastic melt 25 is still flowable, it is already known to assist the injection molding process by injecting gas, usually nitrogen, under pressure into the plastic melt 25 in the mold cavity 16 through a gas injection nozzle 26.

Gas injection nozzle 26 is a stationary-type nozzle that comprises a lower threaded shank 28, an intermediate hexagonal base 30 and an upper tip 32. Nozzle 26 is hollow with an inlet 34 at the lower end of shank 28 and several tiny outlets 36 in tip 32. By way of example, a typical gas injection nozzle has a length of 0.75 inch, a width of 0.25 inch at the hexagonal base 30, and a width of 0.125 inch at the top of the tip 32. The typical tip has 53 outlets 0.007 inch in diameter with five through the top wall and the remaining 48 arranged in four rows of 12 equally circumferentially spaced outlets through the sidewall.

Gas injection nozzle 26 is screwed into lower mold part 12 by turning hexagonal base 30 using a suitable tool until base 30 is tightly seated on surface 22 of lower mold part 12.

When gas is injected into the plastic melt in mold cavity 16, the gas does not mix with the plastic melt 25 but follows the path of least resistance and forms a gas core or channel 29 within the plastic melt 25 that pushes the plastic melt against the mold surfaces 22 and 24. The shape of the gas channel 29 is controlled by regulating the pressure of the gas that is injected into the plastic melt 25, and the gas channel 28 is typically shaped so that all portions of the cast part have a similar thickness.

The plastic melt 25 is injected into the thinner portions of the mold cavity 16 and then flows from the thinner portion into the thicker portions of the mold cavity 16 as indicated by the arrow 38 in FIG. 1. As the plastic melt 25 flows into the thicker portions of the mold cavity 16, the plastic flows around the gas injection nozzle 26. Ideally, the plastic melt seals around the gas injection nozzle 26 so that the gas that is subsequently injected into the plastic melt remains entrained in the plastic melt and forms the desired gas channel.

There are several factors that affect the sealing of the plastic melt around the gas injection nozzle 26 including the direction of the plastic melt flow, turbulence in the plastic melt flow, mold temperature, and timing between the plastic injection and the gas injection.

In some instances, the plastic melt 25 may not seal around the base 30 and tip 32 of the gas injection nozzle 26 adequately. In such cases, a portion of the injected gas may follow along the surface of the gas injection nozzle 26 and work its way into a position 116 between the mold surface 22 and the plastic melt 25. When this occurs, the gas has a tendency to lift the plastic melt 25 away from the mold surface, resulting in defective parts. FIG. 1 shows an instance of inadequate sealing of the plastic melt 25 around the gas injection tip 26 resulting in a defective part where the plastic melt 25 was lifted away 116 from mold surface 22 behind base 30.

Such sealing problems can be avoided by forming a barrier in the surface 22 of the mold cavity 16 in a spaced surrounding relationship to the gas injection nozzle.

Figure 2:
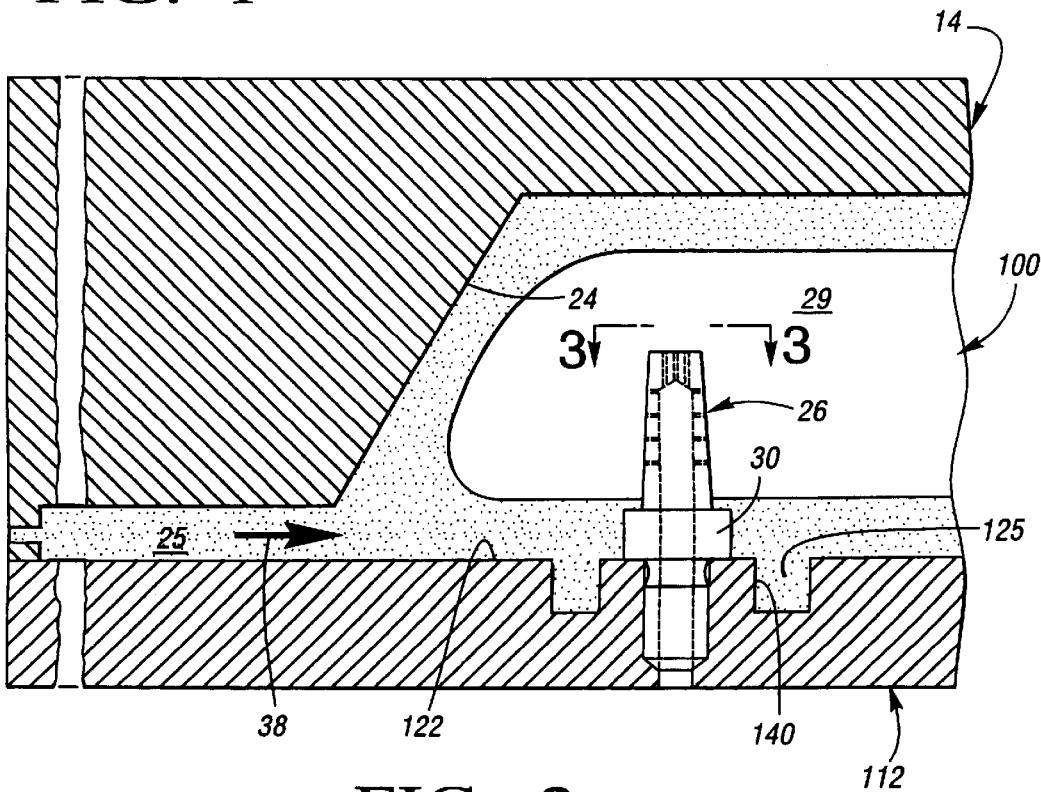
FIG. 2 is a fragmentary longitudinal section of a gas-assisted injection mold in accordance with a first embodiment of the invention.
Figure 3:
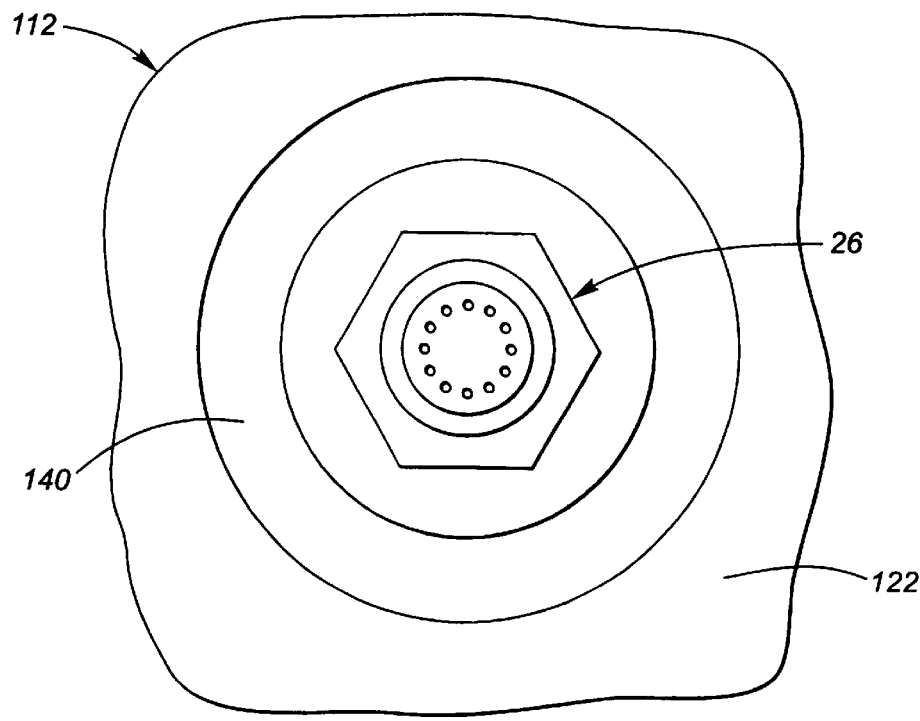
FIG. 3 is a section taken substantially along the line 3—3 of FIG. 2 looking in the direction of the arrows.

FIGS. 2 and 3 illustrate a first embodiment of this invention in which the gas-assisted injection mold 100 of the invention incorporates a concentric annular well 140 that is recessed in the mold surface 122 of the lower mold part 112. The well 140 surrounds and is radially spaced from the base 30 of the gas injection nozzle 26, which is identical to the gas injection nozzle 26 which is described in detail in connection with FIG. 1. The upper mold part 14 is also identical, and the same identifying numerals for the gas injection nozzle 26 and the upper mold part 14 are used throughout FIGS. 1, 2, 3 and 4.

The well 140 should be large enough for the plastic melt 125 to flow into it during the plastic injection phase. The well 140 should also be spaced far enough from the base 30 to encourage the plastic melt to flow into the well. It has been found that an annular well that has its inner and outer circumferential walls spaced apart about 2 mm in the radial direction and that has a depth of about 2 mm and that is spaced radially outwardly of the base 30 about 2 mm works well with the gas injection nozzle 26 that is described in detail above. The size and spacing of the well 140 is related to the size of the gas injection nozzle and, consequently, it is anticipated that some modest adjustment may have to be made for different sized gas injection nozzles.

Except for well 140, lower mold part 112 is otherwise the same as lower mold part 12, and corresponding elements are identified in FIGS. 2 and 3 by adding 100 to the identifing numerals used in connection with FIG. 1.

Gas is always injected in a non-visible surface of the molded product because the gas injection nozzle 26 always leaves a hole in the molded product. Hence, the molded annular ring on the molded product produced by well 140 is usually of no consequence.

Figure 4:
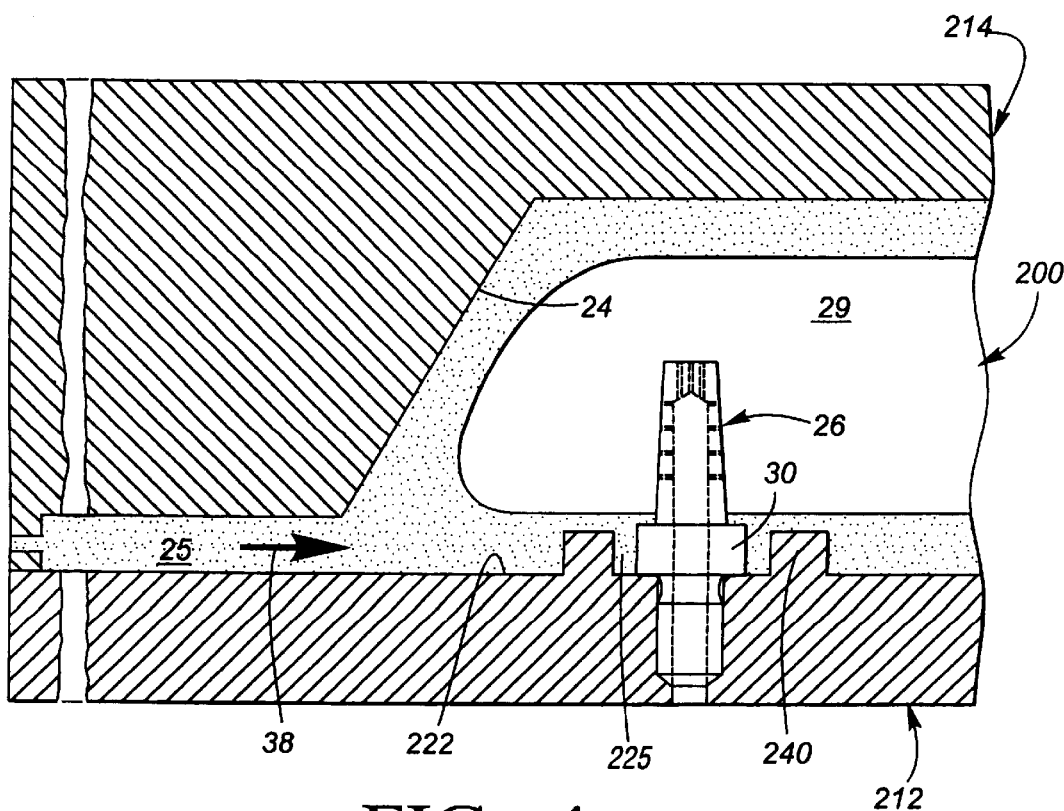
FIG. 4 is a fragmentary longitudinal section of a gas-assisted injection mold in accordance with a second embodiment of the invention.

FIG. 4 illustrates a second embodiment of this invention in which the gas-assisted injection mold 200 incorporates a concentric annular boss 240 that is raised up out of the mold surface 222 of the lower mold part 212. The boss 240 surrounds and is radially spaced from the base 30 of the gas injection nozzle 26, which is identical to the gas injection nozzle 26 which is described in detail in connection with FIG. 1. The upper mold part 14 of the second embodiment of this invention is also identical, and the same identifying numerals for the gas injection nozzle 26 and the upper mold part 14 are used throughout FIGS. 1, 2, 3 and 4.

The boss 240 should be large enough for the plastic melt 225 to conform to during the plastic injection phase. The boss 240 should also be spaced far enough from the base 30 to encourage the plastic melt 225 to flow into the space between base 30 and boss 240. It has been found that an annular boss that has its inner and outer circumferential walls spaced apart about 2 mm in the radial direction and that has a height of about 2 mm and that is spaced radially outwardly of the base 30 about 2 mm also works well with the gas injection nozzle 26 that is described in detail above. The size and spacing of the boss 240 is related to the size of the gas injection nozzle and, consequently, it is anticipated that some modest adjustment may have to be made for different sized gas injection nozzles.

Except for boss 240, lower mold part 212 is otherwise the same as lower mold part 12, and corresponding elements are identified in FIGS. 2 and 3 by adding 200 to the identifying numerals used in connection with FIG. 1.

As indicated above, gas is always injected in a non-visible surface of the molded product because the gas injection nozzle always leaves a hole in the molded product. Hence, the molded annular groove in the molded product produced by boss 240 is usually of no consequence. In some instances, the annular groove produced in gas-assisted injection mold 200 may be preferred over the annular ring produced in gas assisted injection mold 100 and vice versa, depending on how the molded product is used.

While this invention has been illustrated in conjunction with a gas-assisted injection mold having a single stationary gas injection nozzle, this invention may also be used with gas-assisted molds having several stationary gas injection nozzles or molds having one or more retractable gas injection nozzles or molds having combinations of stationary and retractable gas injection nozzles.

Obviously, many modifications and variations of the present invention in light of the above teachings may be made. It is, therefore, to be understood that, within the scope of the appended claims, the invention may be practiced otherwise than as specifically described.

I claim:

1. A gas assisted injection mold comprising;

an upper mold part and a lower mold part that are shaped to provide a mold cavity when the upper mold part and the lower mold part are clamped together, one of the mold parts having a gas injection nozzle that projects into the mold cavity from a surface of the one mold part that partially defines the mold cavity, and the surface having a barrier in a spaced surrounding relationship to a base of the gas injection nozzle;

wherein the barrier is a well that is recessed in the surface of the one mold part.

2. The gas-assisted injection mold as defined in claim 1 wherein the barrier is annular and concentrically arranged with respect to the base of the gas injection nozzle.

3. A gas assisted injection mold comprising;

an upper mold part and a lower mold part that are shaped to provide the mold cavity when the upper mold part and the lower mold part are clamped together, one of the mold parts having stationary gas injection nozzle that projects into the mold cavity from a surface of the one mold part that partially defines the mold cavity, the gas injection nozzle having a hexagonal base that abuts the surface of the one mold part, and the surface having a concentric, annular barrier in a spaced surrounding relationship to the hexagonal base of the stationary gas injection nozzle;

wherein the barrier is a well that is recessed in the surface of the one mold part.

4. The gas assisted injection mold as defined in claim 3 wherein the well is recessed in the surface of the one mold part to a depth of about 2 mm.

* * * * *